United States Patent [19]

Pirani et al.

[11] Patent Number: 5,105,184

[45] Date of Patent: Apr. 14, 1992

[54] METHODS FOR DISPLAYING AND INTEGRATING COMMERCIAL ADVERTISEMENTS WITH COMPUTER SOFTWARE

[76] Inventors: Noorali Pirani, 10806 Poblado Rd. #122, San Diego, Calif. 92127; David Ekedal, 5661 Palmerway Suite F, Carlsbad, Calif. 92008

[21] Appl. No.: 435,066

[22] Filed: Nov. 9, 1989

[51] Int. Cl.⁵ .............................................. G09G 5/00
[52] U.S. Cl. ....................................... 340/721; 340/734
[58] Field of Search ............... 340/721, 734; 304/400, 304/401

[56] References Cited

U.S. PATENT DOCUMENTS

| | | |
|---|---|---|
| 4,674,040 | 6/1987 | Barker et al. .................... 340/734 |
| 4,763,356 | 8/1988 | Day, Jr. et al. .................. 340/734 |
| 4,782,463 | 11/1988 | Sanders et al. . | 
| 4,868,552 | 9/1989 | Chang ............................ 340/734 |
| 4,907,086 | 3/1990 | Truong .......................... 340/734 |

OTHER PUBLICATIONS

"Prodigy" by Prodigy Services Company, 1989.
"The Duel: Test Drive II" by Accolade 550 S. Winchester Blvd., San Jose, CA 95128, PC Magazine pp. 448-450, Jul. 1989.

Primary Examiner—Jeffery A. Brier

[57] ABSTRACT

Commercial advertisements of small (30), medium (35) or full page (39) size to be integrated with different screen types (19) which will result in a change from screen before the advertisements (10) to screen after the advertisements (18). Also, the sequence of different size screens will be integrated. These advertisements may, maynot, or only partially integrated in the first screen (20) second screen (22), third screen (24), menu screen (26), or last screen (28). In addition, a commercial advertisement of an appropriate size (30) may be integrated with different screens at different locations on the screen. Furthermore, a directory advertisement accessable by menu (40) or other input devices to display various commercial advertisements.

1 Claim, 7 Drawing Sheets

FIG.8

| SATURN | | | | | SPECIALS 32A | HIGHLIGHT 33A | TOOLBOX 34A | STYLUS 35A | CLEAR 36A 37 |

Special Equipmet Request Worksheet

Page 1 — Dealer Info 90A

Model 23A | Year 24A | Qty 25A | Bid Date 26A | Saturn Ord No. 27A | 21A 20A 75A
41A | 51A | 61A | 71A Dealer Contract
Customer Name Return Request To | Street Address | City | State | Zip
Dealer Phone No.

REQUIRED OPTIONS 31A
RPO/SEO No

| Tires | Interior |
| Engine | Exterior |
| Fuel Tank | Brake Type |
| Trans | Air Cond |
| Seat Mat'l | Audio Pkg |
| Battery | Ex Sys |

38A
Date Entered:
Date Received:
Answerback:
Acknowledgement
839 Number

SP EQUIP
COMP

10 — BABYCOLA 14

Figure 9:
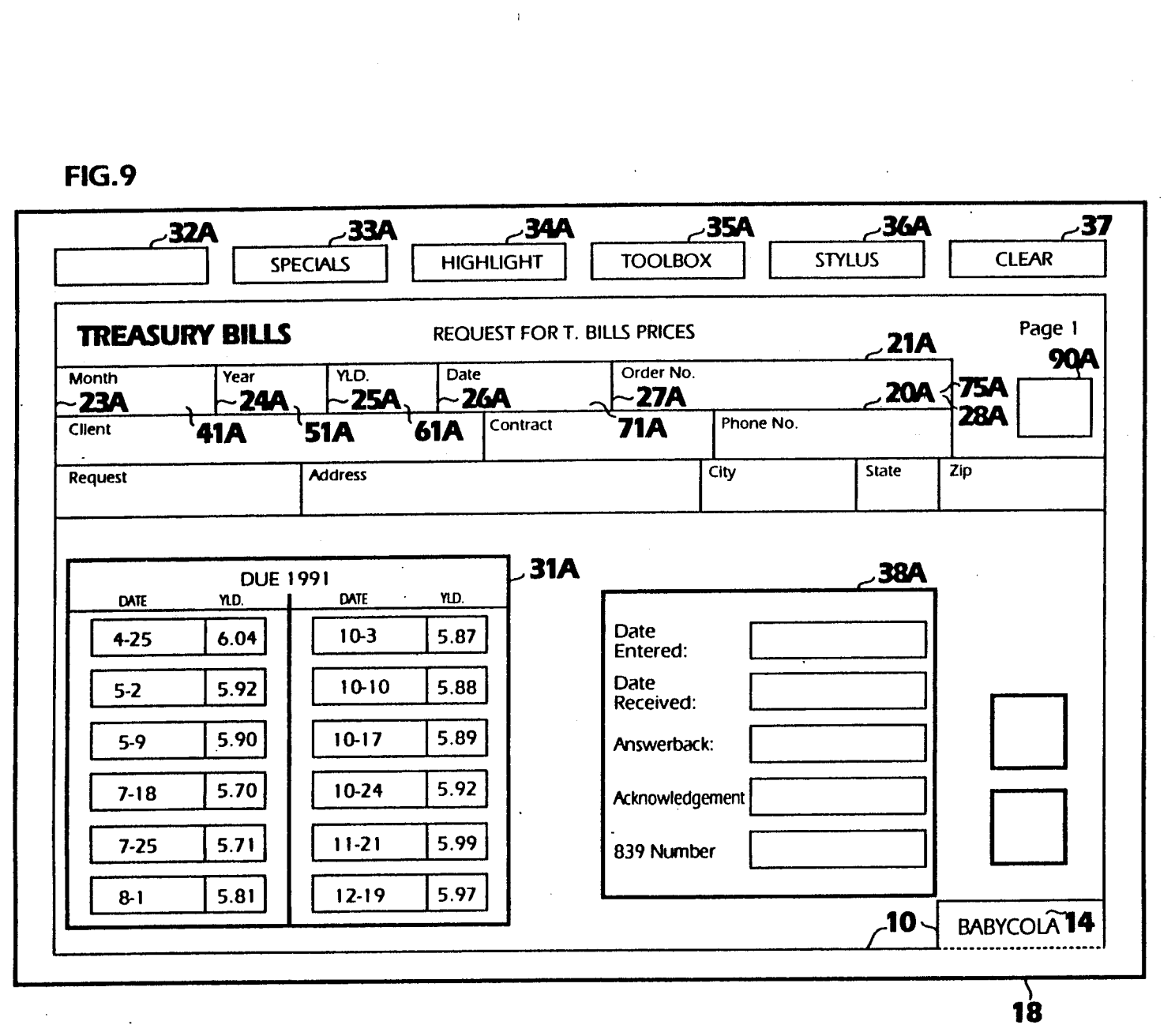

TREASURY BILLS
REQUEST FOR T. BILLS PRICES

SPECIALS  HIGHLIGHT  TOOLBOX  STYLUS  CLEAR

Page 1

Month | Year | Yld. | Date | Order No.
Client | | | Contract | Phone No.
Request | Address | | City | State | Zip

DUE 1991

| DATE | YLD. | DATE | YLD. |
|------|------|------|------|
| 4-25 | 6.04 | 10-3 | 5.87 |
| 5-2  | 5.92 | 10-10 | 5.88 |
| 5-9  | 5.90 | 10-17 | 5.89 |
| 7-18 | 5.70 | 10-24 | 5.92 |
| 7-25 | 5.71 | 11-21 | 5.99 |
| 8-1  | 5.81 | 12-19 | 5.97 |

Date Entered:
Date Received:
Answerback:
Acknowledgement:
839 Number:

BABYCOLA

METHODS FOR DISPLAYING AND INTEGRATING COMMERCIAL ADVERTISEMENTS WITH COMPUTER SOFTWARE

BACKGROUND—FIELD OF INVENTION

This new use relates to the methods of displaying and integrating commercial advertisements with software programs used on, specifically but not limited to, INTEL 80xxx and Motorola 68xxx microprocessor based computers.

BACKGROUND—DESCRIPTION OF PRIOR ART

Integration of commercial advertisements with other products especially media products such as newspaper and commercial television has been done successfully to promote the sale of such products. For example, newspapers could not be sold at the price it is sold now without the revenue from commercial advertisements.

Although electronic computers have been in use since the 1950's, no systematic methods have been used to integrate commercial advertisements with a computer software. The examination of leading software titles confirm this statement. Turbo Pascal by Borland, Lotus 1-2-3 by Lotus Development Corporation, Word Perfect by Word Perfect Corporation, Dbase IV by Ashton-Tate Corporation, PC Tools Deluxe by Central Point Software, Netware by Novell, Excel by Microsoft, Dac Easy Accounting by DAC Software, PC-DOS and OS/2 by IBM are examples of such software. These software do not integrate advertisements with their contents.

Some computer software provide identification of products by using the products as part of the software. "The Duel: Test Drive II" by Accolade is a good example of such software. In this software Ferrari F40 and Porsche 959 have been used as a part of the software. But the product identification is not distinct from the software itself.

Some other software provide on line services for selling various products. "Prodigy" by Prodigy Services Company is an example of such software. The purpose of this software is to provide various services on line. Selling various products through advertisements of such products is one of the services. Although, integration of advertisements with the software has taken place here, this integration is not the same type of integration as suggested by us. There are several differences between "Prodigy" type software advertisements integration and "Masonry Estimating Software" type software advertisements integration done by us. They are: (1) The purpose of Prodigy type integration is direct sales while the purpose of "Masonry Estimating Software" type integration is additional income to the software manufacturers. (2) "Prodigy" is an on line services while "Masonry Estimating Software" does not require a telephone or a modem. (3) The main emphasis by "Prodigy" is on direct sale and information exchange while main emphasis by "Masonry Estimating Software" is on live software. (4) The method of integration used by "Prodigy" is completely different from methods of integration used by us.

There are some software which provide product information on computer disks. These software may be called yellow pages of computer software. The sole purpose of such computer software is product advertisements. The sole purpose of our software is to provide extra income for various types of software manufacturers. We have achieved this purpose by integrating and displaying advertisements with various types of software products.

The examination of the patents issued under class 364 subclass 200 through 400 also reveals that no software patented under these subclasses show methods for integrating advertisements with a software. U.S. Pat. No. 4,782,463 dated Nov. 1, 1988 by Sanders et al. named "Method for Generating Display Screens for a Set of Application Programs by Calling Screen Management Subroutones" shows a method for generating display screens where information and data are to be displayed in fields of various display screens. Two examples are provided for such display screens in FIG. 45 Data Entry Screen and FIG. 46 Status Screen (U.S. Pat. No. 4,782,463 Sheet 28 of 28). New use by us goes further than what is specified in the above patent which clearly does not show any integration of advertisements with such screens.

OBJECTS AND ADVANTAGES

Objects

Therefore, it is an object of this new use to provide an integration between software programs and commercial advertisements by suggesting methods for such integration.

Furthermore, it is a specific object of this new use to provide methods of integrating and displaying commercial advertisements with data entry, help, menu, edit, prompt, report, maintanence, error, action, game, management, user access, and other information screens to be used in system, interface, language, application, games, education, utility, network, or other types of software.

It is also an object of this new use to provide sequence of displays to integrate advertisements with software.

It is another object of this new use to provide directory advertisements integrated with software.

ADVANTAGES

Presently, software development is far behind hardware development. Intel, a computer microchip developer, has already shipped 80286, 80386, and 80486 microchips; and it is in the process of developing 80586 microchips. But, software to utilize fully the advantage of 80286 microchip has began to appear in the market now. Thus, software development is almost three generations behind the hardware development.

Long term committment needed to develop software against comparatively low amount available to buy software by the users has created a roadblock for a small software developer. Integration of commercial advertisements with software will provide additional funds to software manufacturers and will overall increase the availability of software to the user at low cost.

This new use will also help a software manufacturers to fight software piracy indirectly. The software piracy is rampant in the foreign countries where copyright law is not upheld. In such countries a software manufacturer is helpless in stopping thousands of illegal copies made of his software. By teaming up with a local advertiser a software manufacturer can realize some revenue from the source which produce no revenue at all.

This new use can also provide to a small or a new software developer much needed help to launch a software project. By convincing the viability of the project to a commercial company which advertise widely to sell their products, the software developer can receive revenue from such company in exchange for the right to advertise in the new software.

This new use can also provide a marketing tool for a small or a new software manufacturer. If the software is really good, the manufacturer has to convince a company with marketing muscles to advertise his product side by side with the company's advertisement in exchange for the advertisement in the software.

Many ways a small or a new software developer or software manufacturer can benefit from this new use. Of course, a big software developer or a manufacturer will also benefit from this new use, but the new use will provide some standing ground for a small or a new software developer.

The funds available to software manufacturers from other sources will improve the overall health of the software industry.

DRAWING FIGURES

FIG. 1 lists the type of screen which are integrated with advertisements.

Figure 1:
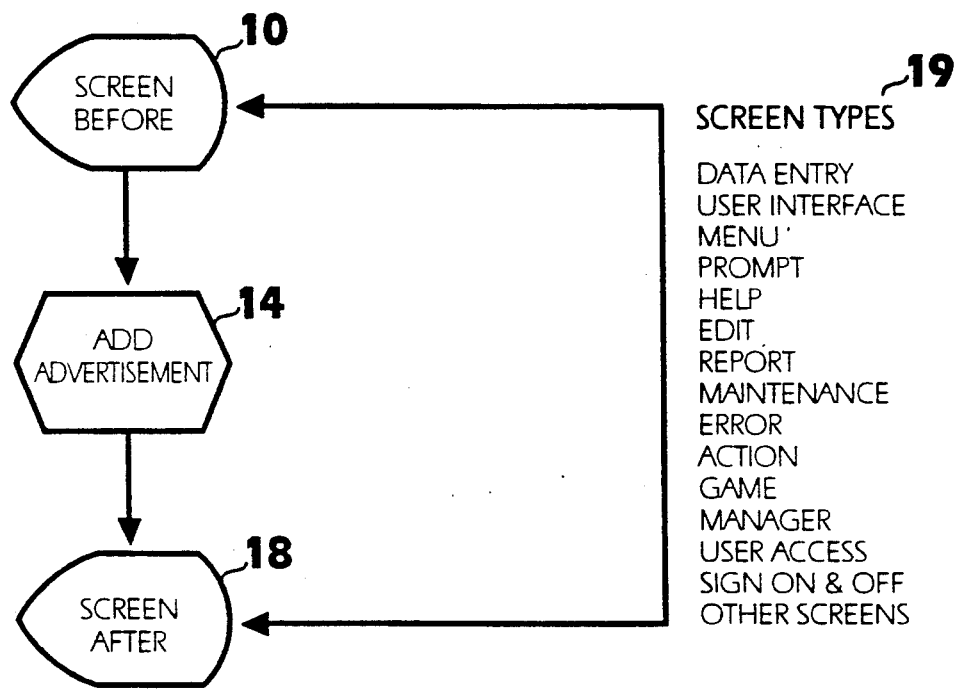

FIG. 8 is a modified version of Sheet 2 of 17 from U.S. Pat. No. 4,763,356. This figure shows the difference between the U.S. Pat. No. 4,763,356 and our patent application. The letter "A" inserted after a numeral indicates the references from the U.S. Pat. No. 4,763,356. The numerals without "A" after them indicates references in our application.

FIG. 9 is also a modification of Sheet 2 of 17 from U.S. Pat. No. 4,763,356. The references are the same as in FIG. 8.

DETAIL EXPLANATION OF THE DRAWING

FIG. 1: Block 10 is a screen before the advertisements are integrated. This screen is a traditional screen. Any type of screen can be included in here. FIG. 45, data entry screen (U.S. Pat. No. 4,782,463 sheet 28 of 28) is this type of screen. Special Equipment Request Worksheet shown on Sheet 2 of 17 of U.S. Pat. No. 4,763,356 dated Aug. 9, 1988 is also the same type of data entry screen.

Block 14 is the portion of a screen where the advertisements are included. This is the addition which is not done by the other software manufacturer at the present time.

Block 18 is the screen after the advertisements are added to the block 10 screen. This is the type of screen which is suggested by us to be used by software manufacturers to receive benefit of integrating advertisements with a software.

Figure 2:
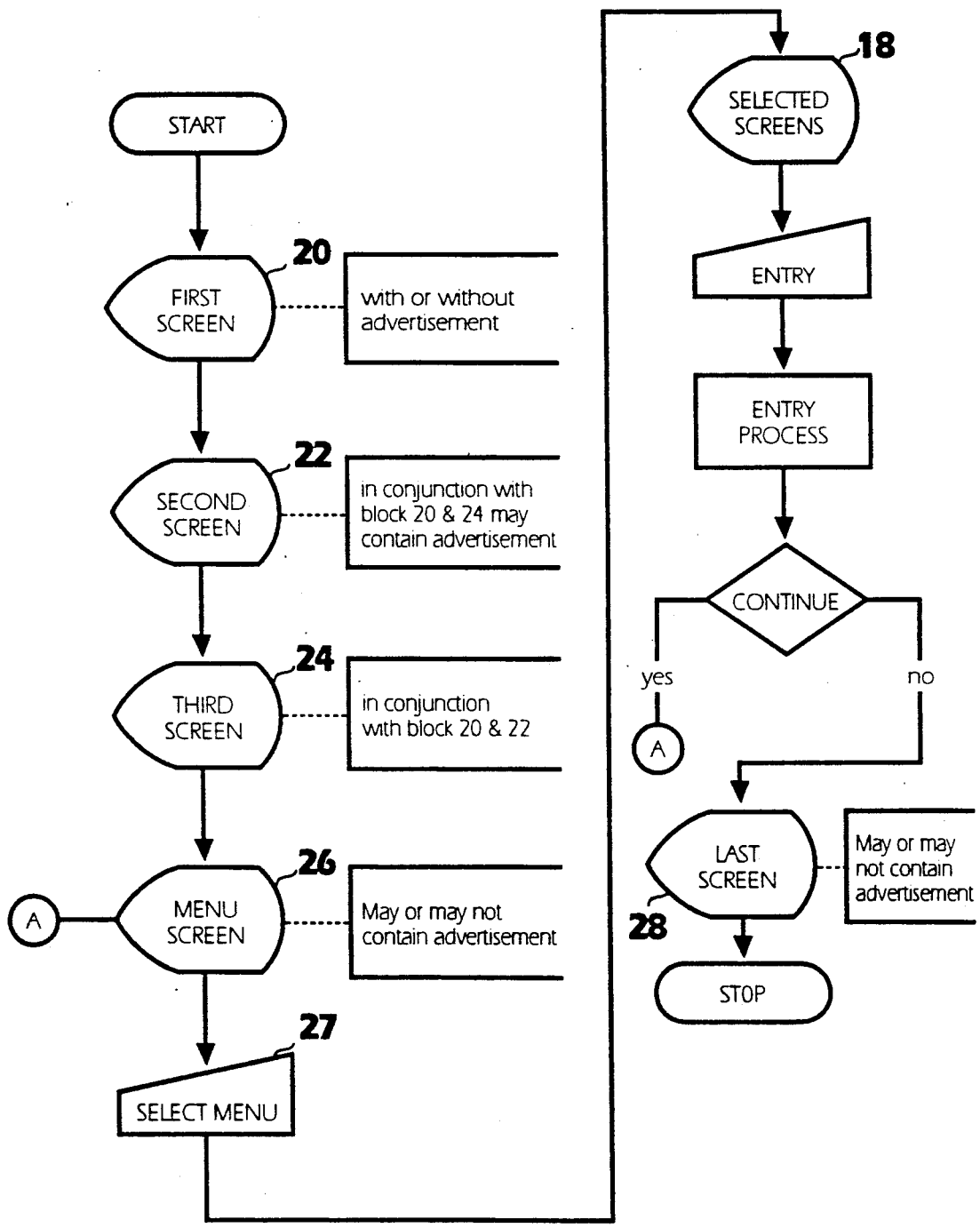
FIG. 2 is the flow chart of the sequence of the screens in a computer software.

FIG. 2: Block 20 is the first screen displayed when software is started. This screen, in conjunction with block 22 and 24, may or may not show advertisement. It may be purely an advertisement screen or may be partly advertisement and partly software manufacturers identification screen. Depending on the choice of the software manufacturer, block 20, 22 and 24 may be a partial or full advertising screen.

Block 26 is a menu screen which access the other parts of the program. Sometimes menu screens can be accessed directly by depressing some keys or touching a part of the screen, or using other means of entering data in to the computer. The menu screen can also be a partial advertisement. Block 30 in FIG. 3 and FIG. 4 is an example of advertisements which are a part of the screen.

Figure 3:
FIG. 3 and FIG. 4 show some of the places where advertisement may be inserted.
Figure 4:

FIG. 3 and FIG. 4: FIG. 3 shows a menu screen with block 30 as an advertisement. Block 30 advertisement can be placed anywhere in the screen. FIG. 4 shows block 30 at a different place on the screen. Block 30 can go anywhere on the screen or it may be larger or smaller than it is shown in these figures.

Figure 5:
FIG. 5 and FIG. 6 show different types and sizes of advertisements which is integrated with a computer software.
Figure 6:
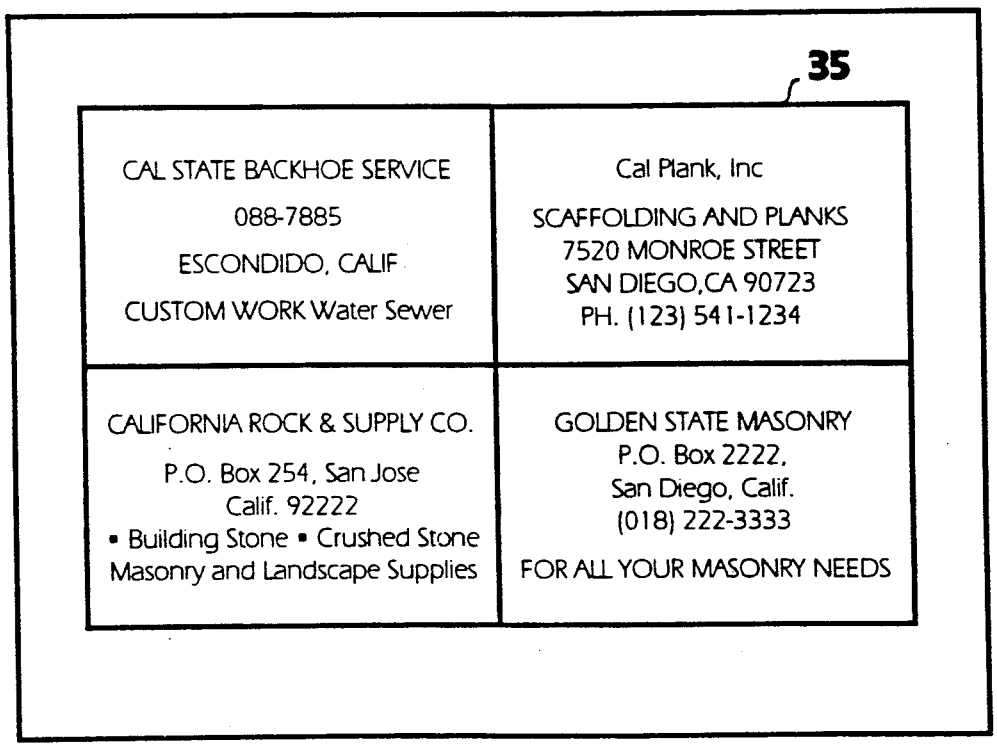

FIG. 5 and FIG. 6: These are two screens with advertisements. These screens can be used in different places suggested in FIG. 2. There may be a variation in the composition of this screen. The screen may be a full screen with only one advertisement as shown in FIG. 5 or the screen could be divided into several small parts as shown in FIG. 6. The advertisement could be as big as a full screen or as small as a single letter on the screen or anywhere in between.

As mentioned earlier FIG. 8 is a modified version of Sheet 2 of 17 from U.S. Pat. No. 4,763,356. In the modified version letter "A" have been added to all numerical references belonging to that patent to distinguish those numerical references from our drawing numerals. A small advertisement from a fictitious BabyCola Company has been added. The numerical reference shown in this modified version are consistent with the numerical references shown on next page (No. 8).

FIG. 9 is the further modification of the Sheet 2 of 17 mentioned in the above paragraph. Here all information related to the fictitious SATURN car is remobed. Instead the information about the Treasury Bills has been inserted. This information is now used by a stock broker to find information about various treasury securities. The BabyCola advertisement is still there. The FIG. 9 shows how our new use is different from the use indicated by Day, Jr. et al.

REFERENCE NUMERALS IN DRAWINGS

10: screen without advertisements
14: add advertisement
18: screen after advertisements
19: screen types
20: first screen after software start
22: second screen after software start
24: third screen after software start
26: menu screen
28: last screen
30: a small advertisement
35: quarter page advertisement
39: full page advertisement
40: advertisements directory menu

METHODS FOR INTEGRATION AND DISPLAY

1. Integration of one letter to a whole screen advertisement with various screens (data entry, menu, edit, etc.) of a software.

2. Displaying advertisement of one letter to a whole screen page integrated with a software in which a sequence of display screens are divided between advertisements and the software. These advertisements are placed on the first screen, second screen, third screen, menu screen, last screen, or any screen in between. It could also be placed as a whole screen, half screen, one-fourth screen, or even a tiny part of the screen.

Figure 7:
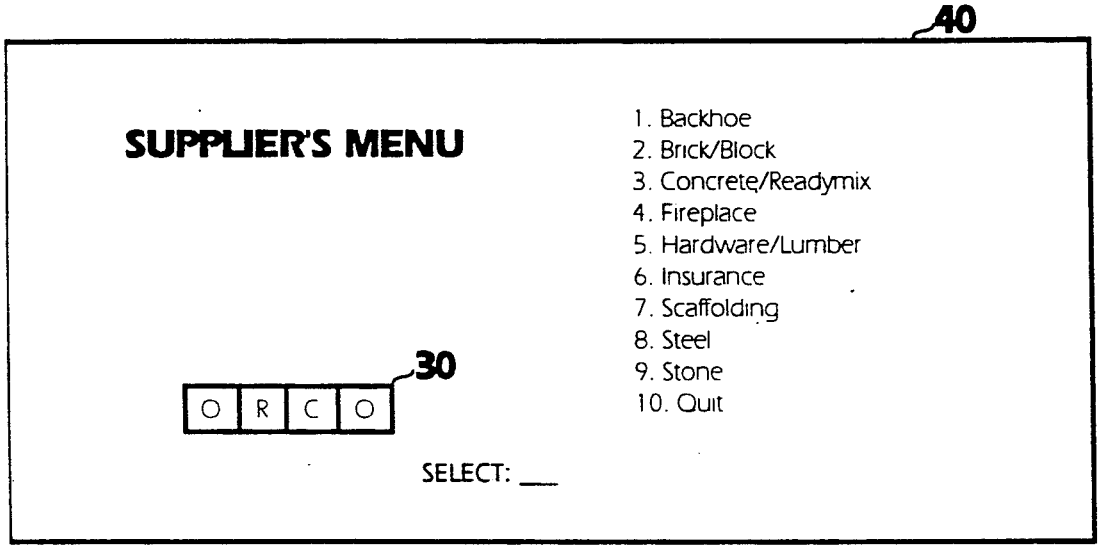
FIG. 7 is a menu for directory advertisements.

3. A directory of advertisements to be accessed by the user. This directory contains names of the advertisements and are accessed by the user by using an input device. Usually a menu shown in FIG. 7 is used to list all advertisers or catagories of advertisers and the access is made via this menu. The advertisement could be a full page, half page, one-fourth page or any part of the screen and could be placed together or separately.

SUMMARY OF THE NEW USE

By integrating and displaying different size and type of advertisements with software screens, this new use will incorporate what is missing from the software industry at the present time. This new use is simple enough for all software manufacturers to use, and yet powerful enough to change the face of the software industry.

Recently "Fortune" magazine published an article about the sorry state of the software industry (Fortune, Sept. 25, 1989, page 100–112). In this article high cost of development and quality control for a good software have been mentioned. We believe that integration of advertisements with software will unleash the funds from other industries. It will improve the health of the software industry in the form of better products, customer satisfaction, information, and long term relationship.

Our methods for integration are simple. Just place advertisements anywhere on the screen used by the user. It could be a whole screen or a part of the screen. It could be discriminately placed in a corner of a screen away from the area used by the user or it could be bold enough to stare the user right in his eyes. There could be several methods used in one software or just only one method used in the software. Whatever is the mix it will provide an advertiser accessability to the eyes of customers.

Based on the information provided in the previous pages, we claim:

1. A small to a full screen commercial advertisement is to be integrated with different types of screens generated by a computer software; and such commercial advertisement is to be integrated by modifying and/or inserting in a data entry, user interface, menu, prompt, help, edit, report, maintenance, error, action, game, sign on and off, and/or other similar screens in such software, wherein said small to a full screen commercial advertisement is to be placed in the different parts of a computer software so that such commercial advertisement becomes an integral part of such software, and yet does not interfere with or alter the original function of such software, and is not necessary for the computer software to function.

* * * * *

REEXAMINATION CERTIFICATE (3232nd)
United States Patent [19]
Pirani et al.

[11] B1 5,105,184
[45] Certificate Issued Jun. 17, 1997

[54] METHODS FOR DISPLAYING AND INTEGRATING COMMERCIAL ADVERTISEMENTS WITH COMPUTER SOFTWARE

[76] Inventors: Noorali Pirani, 10806 Poblado Rd. #122, San Diego, Calif. 92127; David Ekedal, 5661 Palmerway Suite F, Carlsbad, Calif. 92008

Reexamination Request:
No. 90/003,423, May 16, 1994

Reexamination Certificate for:
| | |
|---|---|
| Patent No.: | 5,105,184 |
| Issued: | Apr. 14, 1992 |
| Appl. No.: | 435,066 |
| Filed: | Nov. 9, 1989 |

[51] Int. Cl.$^6$ ....................................................... G09G 5/00
[52] U.S. Cl. ............................................ 345/115; 345/127
[58] Field of Search ...................................... 345/115, 127, 345/113; 664/400, 401

[56] References Cited

U.S. PATENT DOCUMENTS

| | | |
|---|---|---|
| 3,609,250 | 9/1971 | Morris . |
| 4,456,373 | 6/1984 | Best . |
| 4,516,156 | 5/1985 | Fabris . |
| 4,534,391 | 8/1985 | Ventimiglia . |
| 4,652,990 | 3/1987 | Pailen et al. . |
| 4,674,040 | 6/1987 | Barker et al. . |
| 4,763,356 | 8/1988 | Day et al. . |
| 4,782,463 | 11/1988 | Sanders et al. . |
| 4,791,556 | 12/1988 | Vilkaitis . |
| 4,868,552 | 9/1989 | Chang . |
| 4,907,086 | 3/1990 | Truong . |

OTHER PUBLICATIONS

Graphic arts: covering all the bases. (column), Erik Sandberg-Diment, New York Times, vol. 136, Issue: 47,123, p. 21, Apr. 28, 1987.
Carson, "The most Professional Garage Sale in the Neighborhood" Rainbow, vol. 3, Issue n10, pp. 156–164, May 1984.
"The Duel: Test Drive II" by Accolade 550 S. Winchester Blvd., San Jose, CA 95128, PC. Magazine pp. 448–450, Jul., 1989.
"Prodigy" by Prodigy Services Company, 1989.
"Hard Sell on Software", Michael Schrage, The Washington Post, Sep. 27, 1983.

*Primary Examiner*—Alvin Oberley

[57] ABSTRACT

Commercial advertisements of small (30), medium (35) or full page (39) size to be integrated with different screen types (19) which will result in a change from screen before the advertisements (10) to screen after the advertisements (18). Also, the sequence of different size screens will be integrated. These advertisements may, maynot, or only partially integrated in the first screen (20) second screen (22), third screen (24), menu screen (26), or last screen (28). In addition, a commercial advertisement of an appropriate size (30) may be integrated with different screens at different locations on the screen. Furthermore, a directory advertisement accessable by menu (40) or other input devices to display various commercial advertisements.

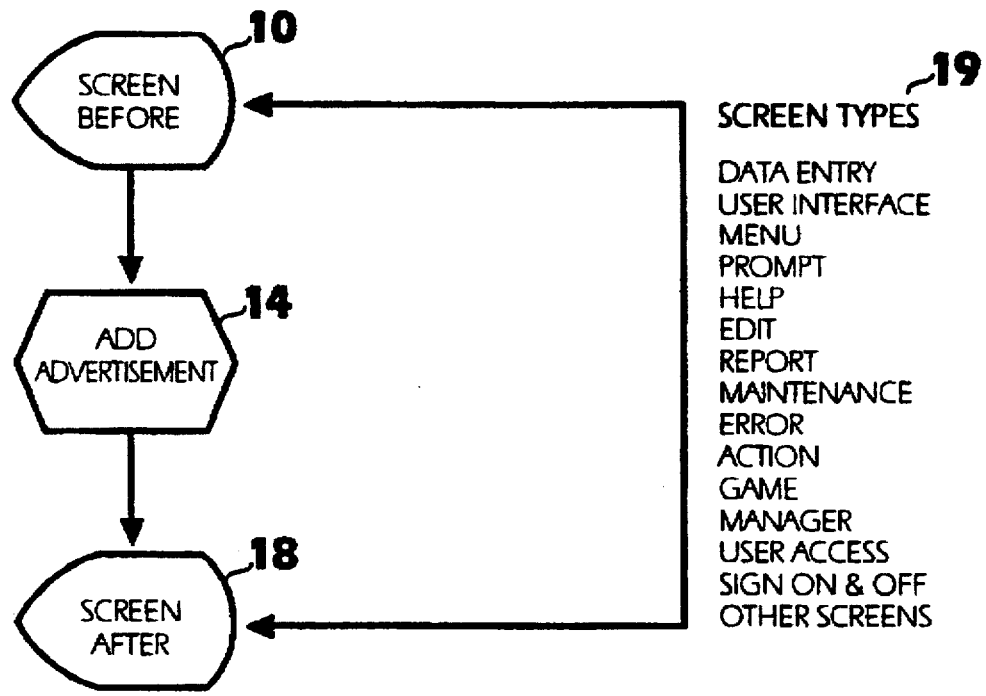

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

\* \* \* \* \*